United States Patent
Patel et al.

(10) Patent No.: US 9,900,440 B1
(45) Date of Patent: Feb. 20, 2018

(54) CONTEXT-DRIVEN TELECONFERENCE SESSION MANAGEMENT

(71) Applicant: INTERNATIONAL BUSINESS MACHINES CORPORATION, Armonk, NY (US)

(72) Inventors: Apurva S. Patel, Pune (IN); Prasad P. Purandare, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/356,115

(22) Filed: Nov. 18, 2016

(51) Int. Cl.
| | | |
|---|---|---|
| H04M 3/42 | (2006.01) | |
| H04M 11/00 | (2006.01) | |
| H04M 1/00 | (2006.01) | |
| H04L 12/16 | (2006.01) | |
| H04N 7/14 | (2006.01) | |
| H04Q 11/00 | (2006.01) | |
| H04M 3/56 | (2006.01) | |
| H04L 12/18 | (2006.01) | |

(52) U.S. Cl.
CPC .......... *H04M 3/56* (2013.01); *H04L 12/1831* (2013.01); *H04M 3/42* (2013.01); *H04M 3/42195* (2013.01); *H04M 2203/2088* (2013.01)

(58) Field of Classification Search
CPC ....... H04M 1/274575; H04M 1/72586; H04M 2203/60; H04M 2203/2072; H04M 2203/2094; H04M 2203/5054; H04M 2242/30; H04M 2250/62; H04M 3/42; H04M 3/4234; H04M 3/42221; H04M 3/42246; H04M 3/42348; H04M 3/42357; H04M 3/42374; H04M 3/4931; H04M 3/56; H04M 3/562; H04M 3/563; H04M 3/564; H04M 3/565; H04M 3/566; H04M 3/567; H04M 3/568; H04M 7/006; H04M 7/15; H04M 7/146; H04M 7/1235; H04L 12/18; H04L 12/1813; H04L 12/581; H04L 47/78; H04L 47/80; H04L 51/04; H04L 63/10;

(Continued)

(56) References Cited

U.S. PATENT DOCUMENTS

| | | | |
|---|---|---|---|
| 5,491,835 A | * | 2/1996 | Sasuta ..................... H04W 4/10 455/17 |
| 5,594,784 A | | 1/1997 | Velius |

(Continued)

FOREIGN PATENT DOCUMENTS

| | | |
|---|---|---|
| EP | 1195041 A1 | 4/2002 |
| WO | 0079775 A1 | 12/2000 |

*Primary Examiner* — Khai N Nguyen
(74) *Attorney, Agent, or Firm* — Cantor Colburn LLP; L Jeffrey Kelly

(57) ABSTRACT

A method for managing a teleconference session includes initiating a teleconference session with a plurality of telecommunication devices, monitoring the teleconference session to identify at least one topic discussed by one or more of a plurality of attendees of the teleconference session, and identifying a unique identification of at least one attendee. The method may further include associating the at least one topic with the unique identification, determining when a first telecommunication device associated with the attendee has disconnected from the teleconference session, determining that the topic is discussed by a second attendee of the plurality of attendees after the first telecommunication device has disconnected from the teleconference session, and establishing a connection with the first telecommunication device responsive to determining that the topic is discussed by the second attendee.

18 Claims, 5 Drawing Sheets

(58) Field of Classification Search
CPC . H04L 63/104; H04L 63/107; H04L 65/1053;
H04L 65/403; H04L 67/18; H04L 67/24;
H04W 12/08; H04W 4/02; H04W 4/06;
H04W 4/08
USPC ............ 379/90.01, 93.01, 93.21, 157, 158,
379/201.01, 202.01, 207.01; 370/259,
370/260, 261, 262; 455/411, 414.1, 416,
455/566; 709/225
See application file for complete search history.

(56) References Cited

U.S. PATENT DOCUMENTS

| | | | |
|---|---|---|---|
| 6,504,920 B1* | 1/2003 | Okon | H04M 3/42008 379/111 |
| 8,019,069 B1* | 9/2011 | Cyriac | H04M 3/563 379/201.01 |
| 8,144,850 B2 | 3/2012 | Brown et al. | |
| 8,171,087 B2 | 5/2012 | Carrer et al. | |
| 8,194,840 B2* | 6/2012 | Anglin | H04M 3/56 379/202.01 |
| 9,087,521 B2 | 7/2015 | Reynolds | |
| 9,159,322 B2 | 10/2015 | Burke et al. | |
| 2006/0224430 A1 | 10/2006 | Butt | |
| 2010/0135481 A1* | 6/2010 | Frauenthal | H04B 3/23 379/406.06 |
| 2010/0325289 A1 | 12/2010 | Dostal et al. | |
| 2011/0200181 A1* | 8/2011 | Issa | G06Q 10/10 379/93.01 |
| 2014/0052791 A1 | 2/2014 | Chakra et al. | |
| 2014/0066035 A1* | 3/2014 | Melin | H04W 4/16 455/416 |
| 2015/0181020 A1* | 6/2015 | Fitzsimmons | H04M 3/42221 379/67.1 |
| 2015/0319308 A1 | 11/2015 | Katis et al. | |
| 2016/0286049 A1* | 9/2016 | Guo | H04M 3/566 |

* cited by examiner

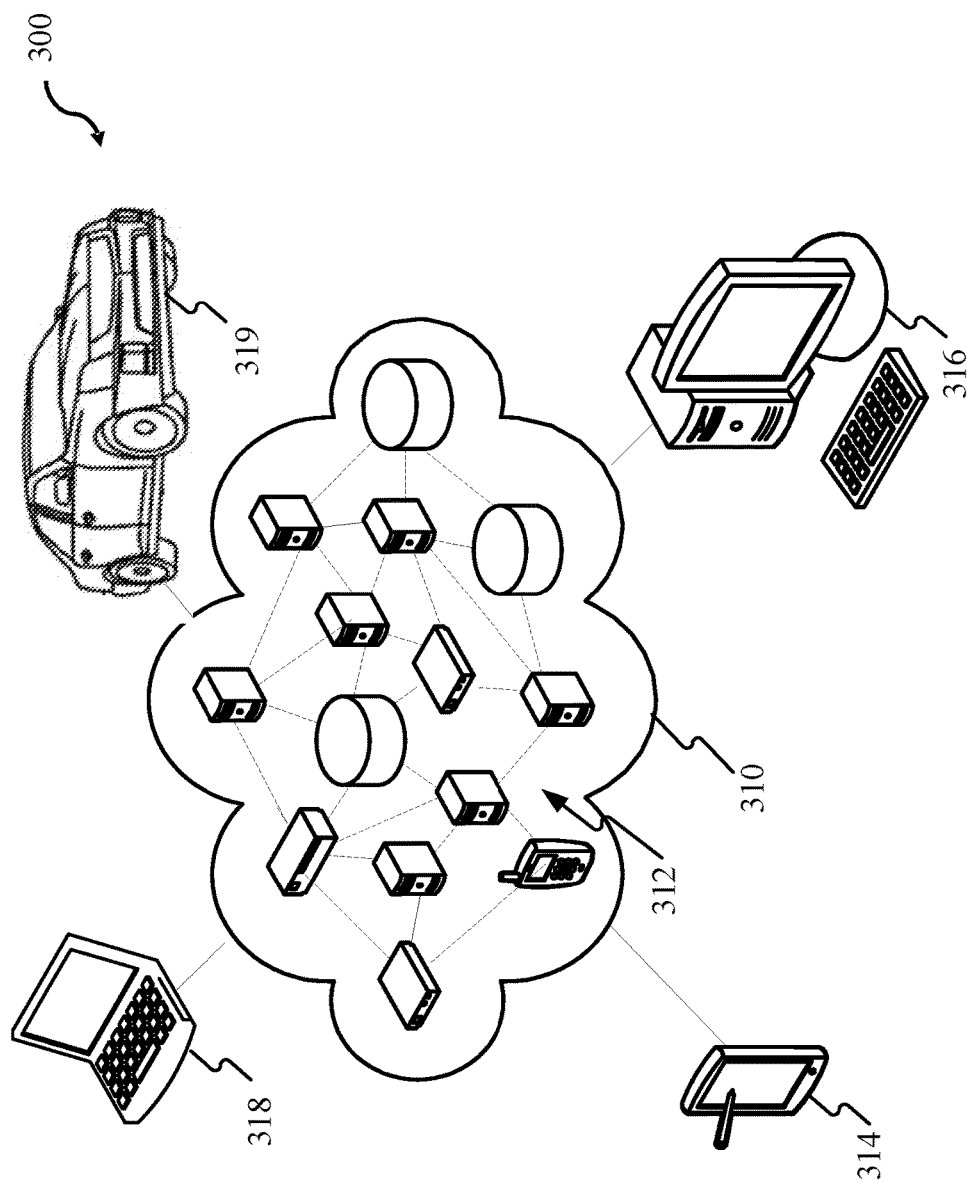
FIG. 3: Exemplary Cloud Computing Environment

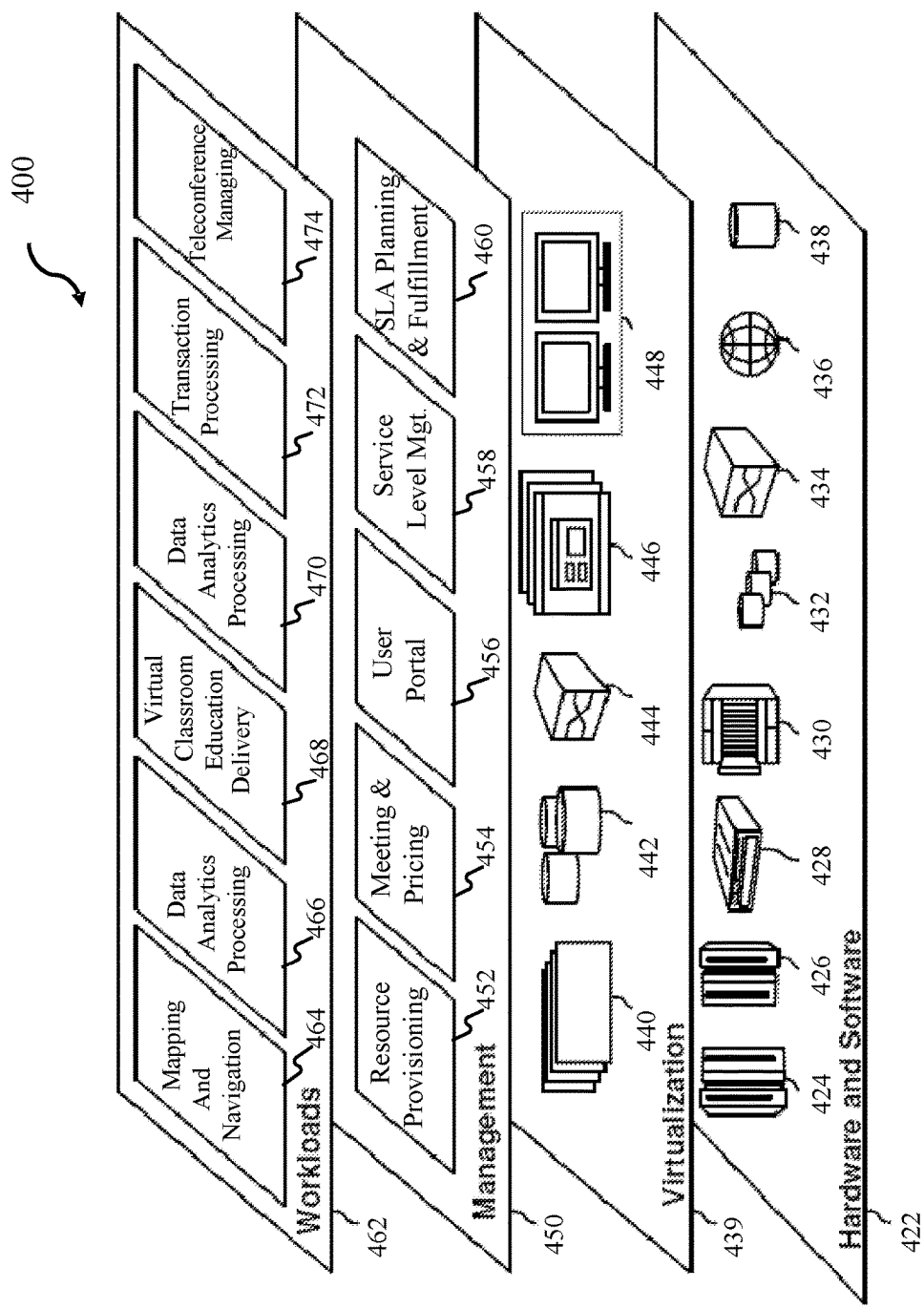
FIG. 4: Exemplary Abstraction Model Layers

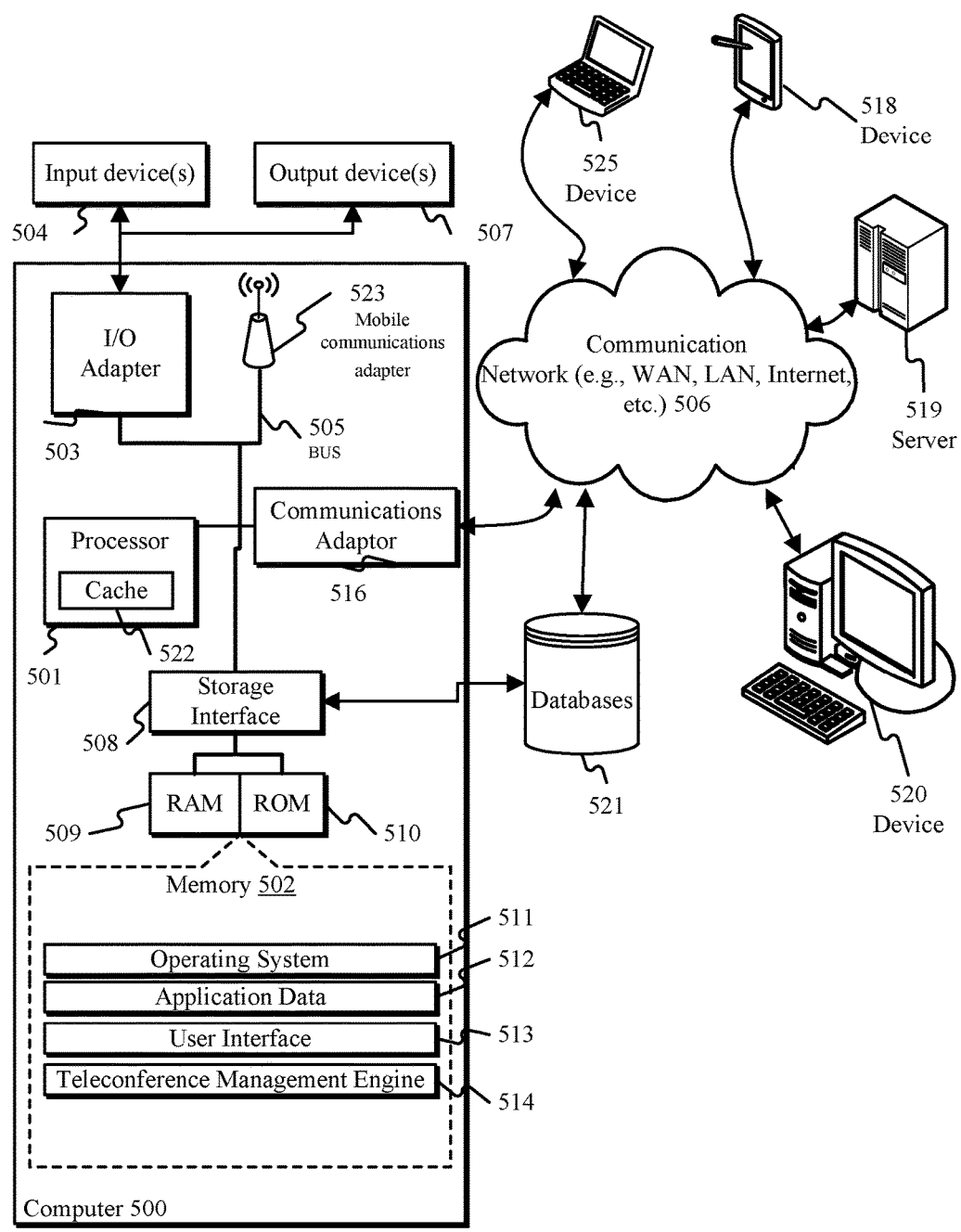
FIG. 5: Exemplary Computer

CONTEXT-DRIVEN TELECONFERENCE SESSION MANAGEMENT

BACKGROUND

The present disclosure relates to context-driven teleconference session management, and more specifically, to dynamic and context-driven teleconference session management.

In business and engineering environments, real-time group meetings with local and remote attendees can enhance collaboration. Conference calls are one common form of collaboration that allows multiple parties to actively communicate in real-time. Conference sessions, whether audio or audio-video, can provide a platform to share ideas, thoughts, and opinions in a dynamic, interactive manner. Conference calls can allow participants to express emotions or feelings directly and transparently. Stated another way, real-time interaction can capture nuances of our verbal communication or the voice modulations in beneficial ways that other non-verbal forms of electronic communication cannot. Whether it is a corporate level conference call or an informal conference call with family or friends, the participants get an opportunity to directly collaborate with everyone involved.

Arranging conference calls can be challenging, especially when there are multiple attendees. Busy schedules and time conflicts can make finding a common time extremely challenging when there are multiple stakeholders that need to coordinate schedules. In some situations, finding a time to conduct a conference call may be as challenging as solving the subject issue to which the meeting is directed.

When the conference call is in progress, all attendees may have an opportunity to discuss each of their personal topics or discussion points. But as the conference call is about to end, attendees generally start dropping the call. If a participant realizes at the very moment of dropping off of the call that they failed to discuss an urgent topic, concern, or question that has not been addressed, the participant may have lost the chance to bring that up and it would now be either deferred to the next conference, which may be difficult or impossible to schedule because of the attendee's busy schedules.

SUMMARY

According to an embodiment of the present invention, a computer-implemented method for managing a teleconference session is described. The method may include initiating, via a processor, a teleconference session with a plurality of telecommunication devices, monitoring, via the processor, the teleconference session to identify at least one topic discussed by one or more of a plurality of attendees of the teleconference session, and identifying, via the processor, a unique identification of at least one attendee. The method may further include associating, via the processor, the at least one topic with the unique identification, determining, via the processor, when a first telecommunication device associated with the attendee has disconnected from the teleconference session, determining, via the processor, that the topic is discussed by the second attendee of the plurality of attendees after the first telecommunication device has disconnected from the teleconference session, and establishing, via the processor, a connection with the first telecommunication device responsive to determining that the topic is discussed by the second attendee.

According to other embodiments, a system for managing a teleconference session is described. The system may a processor configured to: initiate a teleconference session with a plurality of telecommunication devices, monitor the teleconference session to identify at least one topic discussed by at least one attendee of a plurality of attendees of the teleconference session, identify a unique identification of at least one attendee, associate the at least one topic with the unique identification, determine when a first telecommunication device associated with the attendee has disconnected from the teleconference session, determine whether the topic is discussed by the second attendee of the plurality of attendees after the first telecommunication device has disconnected from the teleconference, and establish a connection with the first telecommunication device responsive to determining that the topic is discussed by the second attendee.

According to yet other embodiments, a non-transitory computer-readable storage medium is described. The non-transitory storage medium may include program instructions that are executable by a processor to perform a method for teleconference session management. The method includes initiating a teleconference session with a plurality of telecommunication devices, monitoring the teleconference session to identify at least one topic discussed by one or more of a plurality of attendees of the teleconference session, and identifying a unique identification of at least one attendee. The method may further include associating the at least one topic with the unique identification, determining when a first telecommunication device associated with the attendee has disconnected from the teleconference session, determining that the topic is discussed by the second attendee of the plurality of attendees after the first telecommunication device has disconnected from the teleconference session, and establishing a connection with the first telecommunication device responsive to determining that the topic is discussed by the second attendee.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 depicts a cloud computing environment for use in practicing the teachings herein;

FIG. 4 depicts abstraction model layers according to one embodiment; and

FIG. 5 depicts a block diagram of a computer system for use in practicing the teachings herein.

DETAILED DESCRIPTION

During conference call sessions, participants may choose to disconnect the call early, as the teleconference is wrapping up. While the participants of the teleconference session are getting disconnected, if a participant hangs up prior to another round of discussion regarding a topic critical to the disconnected participant, then the person disconnected may miss out on critical information. Moreover, if the other participants are depending on the disconnected participant for critical input but he or she has disconnected prematurely, the meeting may not be completed.

For example, an urgent problem may arise at a customer site that requires immediate attention. A company responsible for solving the problem may send an engineer at the customer site to address the problem. After arriving on-site and researching the problem, the engineer realizes that she needs inputs from the sales team, the management team, and also the support team, and some senior developers of that technology. The engineer sends invitations to all parties (who live in different time zones on three continents) for an urgent conference call. After many rounds of scheduling, rescheduling, and requesting new times, all the teams agree to join the conference on the following day early in the morning. The senior developers are awake just for this call and finally the call starts. The engineer asks the final questions and the call is about to end. Team members start dropping off the teleconference when suddenly the engineer realizes that she has an urgent question for three developers on the call. But by the time she announces it, the participants are off the call. Since the developers may think that they are done with the call, some of them have logged off. The technical problem remains unresolved and gets pushed on to the next day, which may be unacceptable to the customer.

Figure 1:
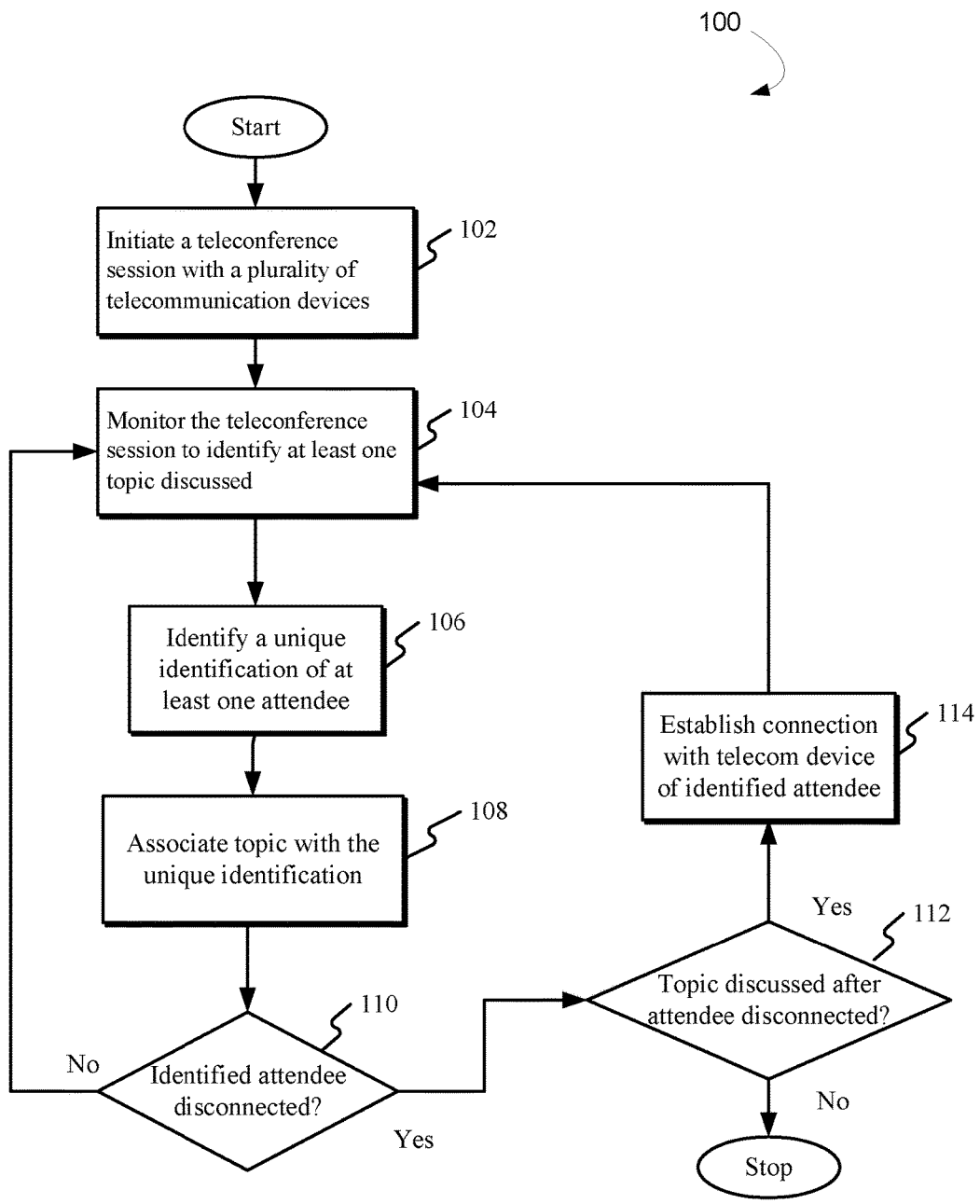
FIG. 1 depicts a flow diagram of a method for teleconference session management according to one embodiment.

It may be advantageous to provide a system and method that automatically monitors a teleconference session, listens for critical topics to be discussed during the meeting, associates individual participants with those topics, and reconnects a participant associated with one of those topics if another attendee initiates or continues discussion of a topic associated with the disconnected party. FIG. 1 depicts a flow diagram of a method 100 for teleconference session management, according to one embodiment.

Referring now to FIG. 1, after an initial starting step, a system processor (e.g., processor 501, described hereafter in greater detail with respect to FIG. 5) may initiate a teleconference session with a plurality of telecommunication devices, as shown in block 102. The telecommunication devices may be, for example, one or more telecommunication devices 518 (shown in FIG. 5), device 520, device 525, etc. Other attendees of the teleconference session can be on separate telecommunication devices.

A teleconference session is a live exchange and mass articulation of information among several persons and telecommunication devices remote from one another but linked by a telecommunications system (e.g., communications network 506). Terms such as audio conferencing, telephone conferencing and phone conferencing are also sometimes used to refer to teleconferencing. The telecommunications system may support the teleconference by providing one or more of the following: audio, video, and/or data services by one or more means, such as telephone, computer, telegraph, teletypewriter, radio, television, etc.

As shown in block 104, processor 501 may monitor the teleconference session to identify at least one topic discussed by at least one attendee of a plurality of attendees of the teleconference session. A topic may be, for example, a particular project, a problem for which a solution is sought, an individual's name, a company, an appointment, a goal, etc.

Figure 2:
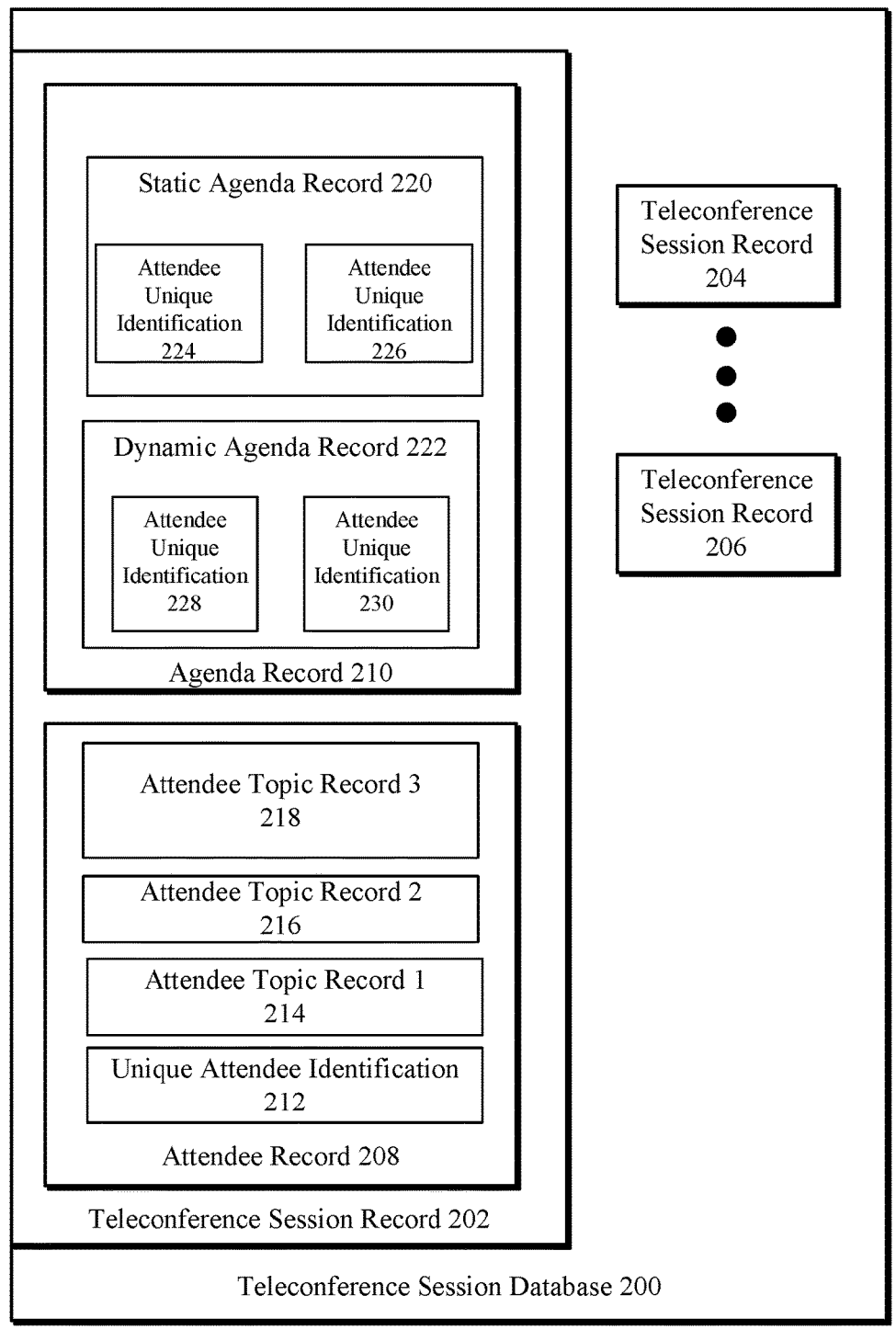
FIG. 2 depicts a block diagram of a teleconference session database according to one embodiment.

In some embodiments, processor 501 may identify the topic by matching the topic to a static teleconference agenda record. A static teleconference agenda record may be, for example, a meeting agenda typed in an email, in a meeting request, or some other electronically stored memorandum. In some aspects, processor 501 may store a static teleconference agenda record. FIG. 2 depicts a teleconference session database 200 that may be used to store, among other information, the static teleconference agenda record.

Referring, briefly, to FIG. 2, teleconference session database 200 (hereafter "session database 200") is described in greater detail. Session database 200 may store information associated with one or more teleconference sessions. Session database may include a plurality of teleconference session records, e.g., session records 202, 204, 206, etc. Although only 3 records are depicted in FIG. 2, session database 200 may contain any number of records. Session record 202 may include information that associates unique individuals to topics discussed in a session or planned in an agenda to be discussed. For example, session record 202 may include an attendee record 208, and an agenda record 210.

Attendee record 208 may include a plurality of information associated with a particular attendee. For example, attendee record 208 may include a unique attendee identification 212, one or more topic records 214, 216, and 218. The topics discussed by individual attendees may be stored in attendee record 208. Although only one attendee record 208 and one agenda record 210 are shown in FIG. 2, it should be appreciated that any number of attendee records are stored in a session record. In some aspects, processor 501 may identify a topic by matching the topic to a static teleconference agenda record 220, discussed below.

An agenda record 210 stores agenda information for a particular session. For example, an agenda record 210 may include a static agenda record 220 and a dynamic agenda record 222.

Static agenda record 220 may include agenda information associated with a teleconference session that attendees plan to discuss. This information may be determined by processor 501 automatically by parsing emails, by receiving or retrieving meeting information, from electronic calendars, or in other ways. Static agenda record 220 may associate particular agenda items with individuals assigned to discuss them. For example, attendee unique identifications 224 and 226, etc. may each store a topic associated with a particular attendee identification.

Dynamic agenda record 222 contains similar information, but can be populated automatically by processor 501. For example, processor 501 may identify a unique identification of at least one of the plurality of attendees responsive to determining that the attendee has discussed a topic during the teleconference session. The topic may be spontaneously discussed or may be planned and recorded in static agenda record 220. Processor 501 may then write attendee unique identification records 228 and 230 for two attendees associated with the topic. They may be associated with the topic if processor 501 determines that they took part in the discussion of that topic.

Referring again to FIG. 1, as shown in block 106, processor 501 may identify a unique identification of at least one attendee. For example, an attendee may be the engineer described above that visits a company to solve a problem. Each attendee of the teleconference can have a unique identification. The identification can be, for example, a name, an employee number, a phone number, a mac address, a device name, or some other unique identifier that can uniquely identify the attendee. Processor 501 may store the unique identification 212 in attendee record 208.

As shown in block 108, processor 501 may associate the at least one topic with the unique identification of the attendee by storing the information in attendee record 208. In one embodiment, processor 501 may match a topic from static teleconference agenda 220 to an attendee (e.g., attendee unique identification 224) regardless of whether the attendee has discussed the topic during the teleconference session.

In other embodiments, processor 501 may identify the topic by a contextual comparison of the topics discussed during the teleconference session by monitoring the teleconference, identifying a topic, making an association between a topic and an individual, and storing the information in dynamic agenda record 222. In some aspects, associating the topic with the unique identification may include creating a topic record (e.g., attendee topic record 214), associating the topic record with the attendee by storing a unique attendee identification 212. Processor 501 may save the topic record to an operatively connected memory device (e.g., memory 502 or databases 521.

As shown in block 110, processor 501 may determine when a first telecommunication device associated with the attendee has disconnected from the teleconference session, as shown in decision block 110. Responsive to determining the attendee has disconnected from the session, processor 501 may determine whether a topic of interest (which may be stored in session record 202) is discussed by a second attendee of the plurality of attendees after the first telecommunication device has disconnected from the teleconference, as shown in decision block 112. If the processor determines at decision block 110 that no attendee has disconnected, the processor continues to monitor the teleconference session (as shown in block 104).

At decision block 112, if processor 501 determines that the topic is not discussed after the attendee disconnects, the process stops.

Responsive to determining that a topic of interest is discussed in the teleconference session after an attendee associated with the topic disconnects, processor 501 establishes a connection with the telecommunication device associated with that attendee, as shown in block 114. For example, processor 501 may automatically dial the telecommunication device of that attendee, initiate a video call, etc. By automatically dialing, processor may, without user intervention, make an independent determination and establish the connection with the disconnected attendee.

Method 100 may be implemented on a server, on an individual computer, or in a cloud computing environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least four service models, and at least four deployment models. Characteristics of a cloud model are described below:

On-demand self-service: a cloud consumer can unilaterally provision computing capabilities, such as server time and network storage, as needed automatically without requiring human interaction with the service's provider.

Broad network access: capabilities are available over a network (e.g., network 506, as depicted in FIG. 5) and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Characteristics of Service Models are described below:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network (e.g., network 506, as depicted in FIG. 5), servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks (e.g., network 506, as depicted in FIG. 5), servers, operating systems, or storage, but has control over the deployed applications and possibly application hosting environment configurations.

Infrastructure as a Service (IaaS): the capability provided to the consumer is to provision processing, storage, networks (e.g., network 506, as depicted in FIG. 5), and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems may include monitoring engines to track performance and usage, error monitoring, and data analysis engines.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party either locally or remotely.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Referring now to FIG. 3, a cloud computing environment 300 for use in practicing the teachings herein is depicted. As shown in FIG. 3, cloud computing environment 300 comprises one or more cloud computing nodes 312 with which local computing devices used by cloud consumers, such as, for example, a mobile device 314, a desktop computer 316, a laptop computer 318, and/or an automobile computer system 319 may communicate. Cloud computing nodes 312 may communicate with one another. They may be grouped (not shown) physically or virtually, in one or more networks 310, such as a Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 314-319 shown in FIG. 3 are intended to be illustrative only and that cloud computing nodes 312 and cloud computing environment 300 can communicate with any type of computerized device over any type of network and/or network addressable connection (e.g., using a web browser).

Referring now to FIG. 4, a set of functional abstraction layers 420 provided by cloud computing environment 10 (as depicted in FIG. 3) is shown. It should be appreciated that the components, layers, and functions of functional abstraction layers 420 depicted in FIG. 4 are illustrative only, and embodiments of the invention are not limited thereto. As depicted, the following layers and corresponding functions are provided:

A hardware and software layer 422 may include hardware and software components. Examples of hardware components can include, for example, mainframes 424, 4RISC (Reduced Instruction Set Computer) architecture based servers 426, servers 428, blade servers 430, storage devices 432, and networks and networking components 434. In some embodiments, software components include network application server software 436 and database software 438.

A virtualization layer 439 may provide an abstraction layer from which the following examples of virtual entities may be provided: virtual servers 440, virtual storage 442, virtual networks 444, which may include virtual private networks, virtual applications and operating systems 446, and virtual clients 448.

In one example, a management layer 450 may provide the functions described below. A resource provisioning module 452 can provide dynamic procurement of computing resources and other resources that may be utilized to perform tasks within the cloud computing environment. A metering and pricing resource 454 may provide cost tracking as resources are utilized within the cloud computing environment, and billing or invoicing for consumption of these resources. In one example, metering and pricing resources may include application software licenses. A user portal 456 may provide access to cloud computing environment 300 for consumers and system administrators (not shown). In some embodiments, user portal 456 may provide security and/or identity verification for cloud consumers (e.g., one or more consumers operating one or more of computing devices 314-319) and tasks, as well as protection for data and other resources. A service level management resource 458 can provide cloud computing resource allocation and management such that required service levels are met. A service level agreement (SLA) planning and fulfillment resource 460 may provide pre-arrangement for, and procurement of cloud computing resources for which a future requirement is anticipated in accordance with an SLA.

A workloads layer 462 may provide functionality for which the cloud computing environment may be utilized. For example, workloads layer 462 may include a mapping and navigation resource 464, a software development and lifecycle management resource 466, a virtual classroom education delivery resource 468, a data analytics processing resource 470, a transaction processing resource 472, and teleconference managing 474.

FIG. 5 illustrates a block diagram of an exemplary computing environment and computer system 500 (hereafter "computer 500") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 500 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 5, the computer 500 includes processor 501. Computer 500 also includes memory 502 coupled to processor 501, and one or more input/output adapters 503 that may be communicatively coupled via system bus 505. Memory 502 may be operatively coupled to one or more internal or external memory devices via a storage interface 508. Communications adapter 516 may operatively connect computer 500 to one or more networks 506. System bus 505 may connect one or more user interfaces via input/output (I/O) adapter 503. I/O adapter 503 may connect a plurality of input devices 504 to computer 500. Input devices may include, for example, a keyboard, a mouse, a microphone, a sensor, etc. System bus 505 may also connect one or more output devices 507 via I/O adapter 503. Output device 507 may include, for example, a display, a speaker, a touchscreen, etc.

Processor 501 is a hardware device for executing hardware instructions or software, particularly that stored in a non-transitory computer-readable memory (e.g., memory 502). Processor 501 can be any custom made or commercially available processor, a central processing unit (CPU), a plurality of CPUs, for example, CPU 501a-501c, an auxiliary processor among several other processors associated with the computer 500, a semiconductor based microprocessor (in the form of a microchip or chip set), or generally any device for executing instructions. Processor 501 can include a cache memory 522, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 522 may be organized as a hierarchy of more cache levels (L1, L2, etc.).

Processor 501 may be disposed in communication with one or more memory devices (e.g., RAM 509, ROM 510, one or more external databases 521, etc.) via a storage interface 508. Storage interface 508 may also connect to one or more memory devices including, without limitation, one or more databases 521, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives may be, for example, a drum, a magnetic disc drive, a magneto-optical drive, an optical drive, a redundant array of independent discs (RAID), a solid-state memory device, a solid-state drive, etc. Variations of memory devices may be used for implementing, for example, teleconference session database 200.

Memory 502 can include random access memory (RAM) 509 and read only memory (ROM) 510. RAM 509 can be any one or combination of volatile memory elements (e.g., DRAM, SRAM, SDRAM, etc.). ROM 510 can include any one or more nonvolatile memory elements (e.g., erasable programmable read-only memory (EPROM), flash memory, electronically erasable programmable read only memory (EEPROM), programmable read-only memory (PROM), tape, compact disc read only memory (CD-ROM), disk, cartridge, cassette or the like, etc.). Moreover, memory 502 may incorporate electronic, magnetic, optical, and/or other types of non-transitory computer-readable storage media. Memory 502 may also be a distributed architecture, where various components are situated remote from one another, but can be accessed by processor 501.

The instructions in memory 502 may include one or more separate programs, each of which comprises an ordered listing of computer-executable instructions for implementing logical functions. In the example of FIG. 5, the instructions in memory 502 may include an operating system 511. Operating system 511 can control the execution of other computer programs and provides scheduling, input-output control, file and data management, memory management, and communication control and related services.

The instructions in memory 502 may further include application data 512, and a user interface 513.

Memory 502 may also include teleconference management engine 514, configured to perform various portions of embodiments described herein. For example, memory 502 may cause processor 501 to initiate a teleconference session with a plurality of telecommunication devices monitor the teleconference session to identify at least one topic discussed by at least one attendee of a plurality of attendees of the teleconference session, identify a unique identification of at least one attendee, associate the at least one topic with the unique identification, and determine when a first telecommunication device associated with the attendee has disconnected from the teleconference session. Teleconference management engine 514 may also cause processor 501 to determine whether the topic is discussed by second attendee of the plurality of attendees after the first telecommunication device has disconnected from the teleconference, and establish a connection with the first telecommunication device responsive to determining that the topic is discussed by the second attendee.

I/O adapter 503 can be, for example but not limited to, one or more buses or other wired or wireless connections. I/O adapter 503 may have additional elements (which are omitted for simplicity) such as controllers, microprocessors, buffers (caches), drivers, repeaters, and receivers, which may work in concert to enable communications. Further, I/O adapter 503 may facilitate address, control, and/or data connections to enable appropriate communications among the aforementioned components.

I/O adapter 503 can further include a display adapter coupled to one or more displays. I/O adapter 503 may be configured to operatively connect one or more input/output (I/O) devices 507 to computer 500. For example, I/O 503 may connect a keyboard and mouse, a touchscreen, a speaker, a haptic output device, or other output device. Output devices 507 may include but are not limited to a printer, a scanner, and/or the like. Other output devices may also be included, although not shown. Finally, the I/O devices connectable to I/O adapter 503 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 500 may include a mobile communications adapter 523. Mobile communications adapter 523 may include GPS, cellular, mobile, and/or other communications protocols for wireless communication.

In some embodiments, computer 500 can further include communications adapter 516 for coupling to a network 506.

Network 506 can be an IP-based network for communication between computer 500 and any external device. Network 506 transmits and receives data between computer 500 and devices and/or systems external to computer 500. In an exemplary embodiment, network 506 can be a managed IP network administered by a service provider. Network 506 may be a network internal to an aircraft, such as, for example, an avionics network, etc. Network 506 may be implemented in a wireless fashion, e.g., using wireless protocols and technologies, such as WiFi, WiMax, etc. Network 506 may also be a wired network, e.g., an Ethernet network, an ARINC 429 network, a controller area network (CAN), etc., having any wired connectivity including, e.g., an RS232 connection, R5422 connection, etc. Network 506 can also be a packet-switched network such as a local area network, wide area network, metropolitan area network, Internet network, or other similar type of network environment. The network 506 may be a fixed wireless network, a wireless local area network (LAN), a wireless wide area network (WAN) a personal area network (PAN), a virtual private network (VPN), intranet or other suitable network system.

Network 506 may operatively connect computer 500 to one or more devices including device 517, device 518, and device 520. Network 506 may also connect computer 500 to one or more servers such as, for example, server 519.

If computer 500 is a PC, workstation, laptop, tablet computer and/or the like, the instructions in the memory 502 may further include a basic input output system (BIOS) (omitted for simplicity). The BIOS is a set of essential routines that initialize and test hardware at startup, start operating system 511, and support the transfer of data among the operatively connected hardware devices. The BIOS is stored in ROM 510 so that the BIOS can be executed when computer 500 is activated. When computer 500 is in operation, processor 501 may be configured to execute instructions stored within the memory 502, to communicate data to and from the memory 502, and to generally control operations of the computer 500 pursuant to the instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing a teleconference session comprising:
    initiating, via a processor, a teleconference session with a plurality of telecommunication devices;
    monitoring, via the processor, the teleconference session to identify a topic discussed by an attendee of the teleconference session;
    identifying, via the processor, a unique identification of the attendee;
    associating, via the processor, the topic with the unique identification;
    determining, via the processor, when a first telecommunication device associated with the attendee has disconnected from the teleconference session;
    determining, via the processor, that the topic is discussed by a second attendee of the plurality of attendees after the first telecommunication device has disconnected from the teleconference session; and
    establishing, via the processor, a connection with the first telecommunication device responsive to determining that the topic is discussed by the second attendee.

2. The computer-implemented method of claim 1, wherein the processor identifies the topic by matching the topic to a static teleconference agenda record.

3. The computer-implemented method of claim 1, wherein the processor matches a topic from a static teleconference agenda to an attendee regardless of whether the attendee has discussed the topic during the teleconference session.

4. The computer-implemented method of claim 1, wherein the processor identifies the topic by a contextual comparison of the topics discussed during the teleconference session.

5. The computer-implemented method of claim 1, wherein identifying the unique identification of the attendeecomprises:
    identifying, via the processor, when the attendee has discussed the topic during the teleconference session.

6. The computer-implemented method of claim 1, wherein associating the topic with the attendee; wherein associating comprises:
    creating a topic record;
    associating the topic, via the processor, with the attendee; and
    saving, via the processor, the topic record to an operatively connected memory device.

7. A system for managing a teleconference session comprising: a processor configured to:
    initiate a teleconference session with a plurality of telecommunication devices;
    monitor the teleconference session to identify a topic discussed an attendee of a plurality of attendees of the teleconference session;
    identify a unique identification of the attendee;
    associate the topic with the unique identification;
    determine when a first telecommunication device associated with the attendee has disconnected from the teleconference session;
    determine whether the topic is discussed by a second attendee of the plurality of attendees after the first telecommunication device has disconnected from the teleconference; and
    establish a connection with the first telecommunication device responsive to determining that the topic is discussed by the second attendee.

8. The system of claim 7, wherein the processor identifies the topic by matching the topic to a static teleconference agenda record.

9. The system of claim 7, wherein the processor matches a topic from a static teleconference agenda to an attendee regardless of whether the attendee has discussed the topic during the teleconference session.

10. The system of claim 7, wherein the processor identifies the topic by a contextual comparison of the topics discussed during the teleconference session.

11. The system of claim 7, wherein the processor is configured to:
    identify the unique identification of the attendeeresponsive to determining that the attendee has discussed the topic during the teleconference session.

12. The system of claim 7, wherein associating the topic with the unique identification; wherein associating comprises:
    creating a topic record;
    associating the topic, via the processor, with the attendee; and
    saving, via the processor, the topic record to an operatively connected memory device.

13. A computer program product for managing a teleconference session, the computer program product comprising a non-transitory computer readable storage medium having program instructions embodied therewith, the program instructions executable by a processor to cause the processor to perform a method comprising:
    initiating a teleconference session with a plurality of telecommunication devices;
    monitoring the teleconference session to identify a topic discussed by an attendee of a plurality of attendees of the teleconference session;
    identifying a unique identification of the attendee;
    associating the topic with the unique identification;
    determining when a first telecommunication device associated with the attendee has disconnected from the teleconference session;
    determining that the topic is discussed by a second attendee of the plurality of attendees after the first telecommunication device has disconnected from the teleconference session; and
    establishing a connection with the first telecommunication device responsive to determining that the topic is discussed by the second attendee.

14. The computer program product of claim 13, wherein the processor identifies the topic by matching the topic to a static teleconference agenda record.

15. The computer program product of claim 13, wherein the processor matches a topic from a static teleconference agenda to an attendee regardless of whether the attendee has discussed the topic during the teleconference session.

16. The computer program product of claim 13, wherein the processor identifies the topic by a contextual comparison of the topics discussed during the teleconference session.

17. The computer program product of claim 13, wherein identifying the unique identification of the attendee comprises:
   identifying, via the processor, when the attendee has discussed the topic during the teleconference session.

18. The computer program product of claim 13, wherein associating the topic with the unique identification; wherein associating comprises:
   creating a topic record;
   associating the topic, via the processor, with the attendee; and
   saving, via the processor, the topic record to an operatively connected memory device.

* * * * *